United States Patent

Cruickshank

Patent Number: 5,644,299
Date of Patent: Jul. 1, 1997

[54] ULTRASONIC MATERIAL LEVEL MEASUREMENT

[75] Inventor: William T. Cruickshank, Port Huron, Mich.

[73] Assignee: Bindicator Company, Port Huron, Mich.

[21] Appl. No.: 255,390

[22] Filed: Jun. 8, 1994

Related U.S. Application Data

[63] Continuation-in-part of Ser. No. 99,135, Jul. 29, 1993, abandoned.

[51] Int. Cl.⁶ ............................................. G08B 21/00
[52] U.S. Cl. .................. 340/617; 340/618; 340/612; 324/76.49; 73/290 V; 367/908
[58] Field of Search ........................ 340/617, 612, 340/618; 324/76.49; 367/908; 73/290 V, 1 H

[56] References Cited

U.S. PATENT DOCUMENTS

| | | | |
|---|---|---|---|
| 4,299,114 | 11/1981 | Silvermetz et al. | 73/290 V |
| 4,540,981 | 9/1985 | Lapetina et al. | 73/290 V |
| 4,594,584 | 6/1986 | Pfeiffer et al. | 73/290 V |
| 4,676,100 | 6/1987 | Eichberger | 73/304 C |
| 4,811,595 | 3/1989 | Marciniak et al. | 73/290 V |
| 5,048,335 | 9/1991 | Marsh et al. | 73/304 C |
| 5,161,411 | 11/1992 | Cruickshank | 73/293 |
| 5,223,819 | 6/1993 | Marsh et al. | 340/617 |
| 5,269,188 | 12/1993 | Esin et al. | 73/1 DV |
| 5,452,611 | 9/1995 | Jones et al. | 73/290 V |

*Primary Examiner*—Jeffery Hofsass
*Assistant Examiner*—Julie B. Lieu
*Attorney, Agent, or Firm*—Barnes, Kisselle, Raisch, Choate, Whittemore & Hulbert P.C.

[57] ABSTRACT

Apparatus for indicating material level that includes a pair of ultrasonic transducers on opposed sides of a space for receiving the material at the level to be detected. A swept frequency oscillator is coupled to one of the transducers so that the transducer radiates into the material space ultrasonic energy that continuously sweeps back and forth between a low frequency range at which such energy is transmitted to the other transducer by resonance of the entire apparatus and independent of presence of material in the material space, and a higher frequency range at which such energy is transmitted to the other transducer only when material is present in the space between the transducers. Detection circuitry indicates presence of material between the transducers upon receipt of the higher frequency energy, and failure of the apparatus upon failure to receive the lower frequency energy.

14 Claims, 5 Drawing Sheets

ULTRASONIC MATERIAL LEVEL MEASUREMENT

This application is a continuation-in-part of application Ser. No. 08/099,135 filed Jul. 29, 1993, abandoned.

The present invention is directed to point level measurement of material in a space between ultrasonic transducers, and more particularly to an apparatus for continually testing and confirming measurement system integrity.

BACKGROUND AND SUMMARY OF THE INVENTION

There are a number of commercially available devices for indicating when material, particularly liquid material, has reached a level to fill a gap or slot between two ultrasonic piezoelectric transducers. One transducer is energized to transmit energy through the material space toward the other. When air fills the material space, the ultrasonic energy is attenuated before reaching the other transducer due to the relatively poor sonic conductivity of the air. On the other hand, when the space is filled with liquid, the ultrasonic energy reaches the second transducer, and is detected by appropriate electronics to indicate that material has reached the level of the transducers. Since absence of detected energy at the receiving transducer can result from failure of the measurement apparatus, including failure of either transducer or of the bond between either transducer and its associated window, it is desirable to provide a mechanism for testing system integrity and operability.

It is a general object of the present invention to provide an apparatus of the described character for determining material level that includes facility for automatic self-testing of the entire apparatus, including the transmitting and receiving transducers and bonding thereof to the associated windows. A more specific object of the present invention is to provide an apparatus of the described character that is economical to fabricate, that automatically performs the self-testing function during operation without operator intervention, that provides an indication of system failure to an operator, and that includes facility for selective testing of system operation independently of actual material level and independently of transducer condition. Another object of the present invention is to provide an apparatus of the described character that is self-calibrating in the sense that changes in temperature, material characteristics, and enclosure style or material are automatically accommodated in both the measurement and self-test modes—i.e., without operator intervention or adjustment.

In the apparatus in accordance with the preferred embodiment of the invention, electrical signals are applied to the transmitting crystal to radiate ultrasonic energy at different high and low frequencies into the material space toward the receiving crystal. Electronic circuitry is responsive to the energy received at the receiving transducer at high frequency for indicating presence of material in the space between the transducers, and at the lower frequency for indicating operative condition of the apparatus. At high frequency, the energy is radiated into the material gap, and energy at the receiving crystal thus indicates presence of material in the gap. At lower frequency, the entire structure of the apparatus is placed in resonance, and energy at the receiving crystal indicates proper operation of the system.

In the preferred embodiment, the transmitting crystal is coupled to a swept frequency oscillator for continuously sweeping back and forth between the high and low ultrasonic frequency ranges. This technique has the advantages not only of automatically and continuously testing system integrity at low frequency between each high frequency measurement cycle, but also readily accommodates a wide variety of differing measurement conditions, liquid temperatures and densities, air bubbles or the like, which would otherwise affect measurement reliability if specific fixed measurement and test frequencies were employed. That is, resonant frequency of the apparatus can change with enclosure and probe geometry, enclosure and probe composition, geometry and composition of the vessel to which the enclosure and probe are mounted, as well as presence or absence of material in the vessel. In the same way, optimum measurement frequency can change with material composition and temperature, presence of air bubbles, etc. as discussed above. By continuously sweeping back and forth between high and low frequency ranges during operation, such changes in optimum self-test and measurement frequencies are automatically accommodated. The electronics may therefore be employed in conjunction with a number of probe and enclosure geometries and compositions, and the entire system may be employed in conjunction with a wide variety of vessels and materials, without design change or adjustment. Furthermore, once installed in a particular application, any changes due to variations in operating conditions are effectively ignored.

In the preferred embodiment of the invention in which the energy radiated into the material space is continuously and alternately swept back and forth between high and low frequency ranges, the energy received at the receiving crystal transducer is converted to a pulsed signal having a pulse width that varies as a function of time during which ultrasonic energy is received at the receiving transducer. If only air is present between the transducers, this pulse duration would be relatively short, reflecting duration of resonance in the low frequency range. If material is present between the transducers, the pulsed signal would be of longer duration, while a system failure would result in a signal of zero pulse duration. Time duration of the pulsed signal is therefore compared to a first threshold for indicating system failure when the pulse duration is below such threshold, and to a second higher threshold for indicating presence of material between the transducers when the pulse duration is of correspondingly greater duration. Separation of these thresholds accommodates a variety of differing materials and measurement conditions as described above.

The apparatus of the preferred embodiment of the invention also includes facility for selectively testing operation of the apparatus independently of the transducers and of presence or absence of material in the space between the transducers. Specifically, a pair of switch elements are connected in series between the transducers. The first switch element is normally open, and closes in response to selection of a test mode of operation. The first switch device may comprise a reed switch responsive to placement of a magnet externally adjacent to the apparatus, or a photo-optical switch responsive for remote selection of a test mode of operation. The second switch element, which may comprise jumpers programmed at the time of manufacture or installation of the apparatus, has one conductive condition for applying energy from the first switch, when closed, to the second crystal, and thereby simulating presence of material between the transducer crystals independently of actual material level. In the second condition of the second switch element, energy from the first crystal through the first switch element is fed to ground, thereby simulating system failure.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
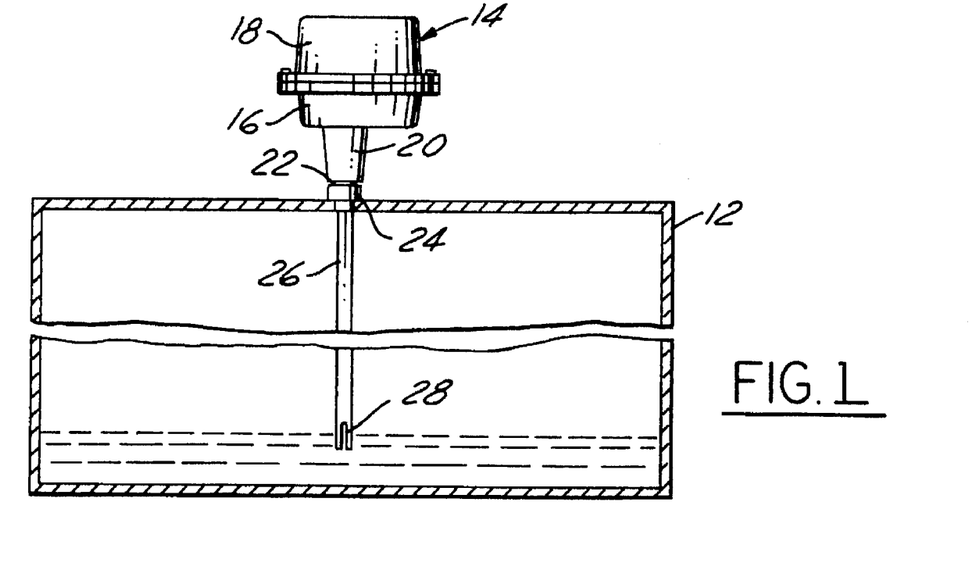
FIG. 1 is a fragmentary sectional view that illustrates a liquid level detection system in accordance with one presently preferred embodiment of the invention.
Figure 2:
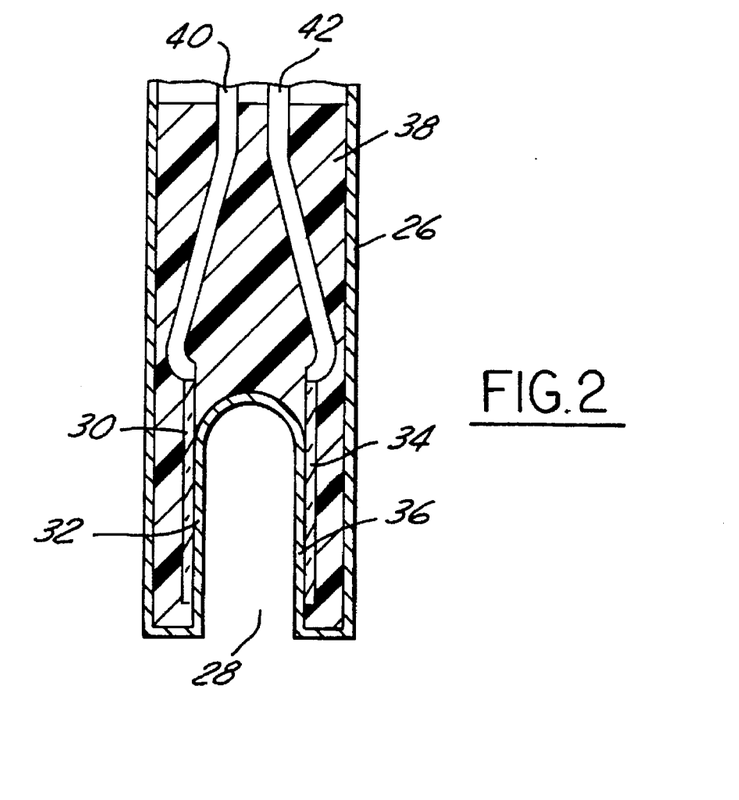
FIG. 2 is a fragmentary sectional view on an enlarged scale of the tip of the measurement probe illustrated in FIG. 1.

FIG. 1 illustrates a system 10 for indicating level of liquid material in a containment vessel 12, in accordance with a presently preferred embodiment of the invention, as comprising a housing 14 formed by opposed cup-shaped base and cover housing sections 16, 18. A hollow neck 20 integrally projects from base 16 to a lower end that threadably receives a mounting connector 22. The base-remote end of connector 22 is adapted to be threadably received into a hollow gland 24 affixed to a wall of vessel 12. A hollow probe 26 extends from base 16 through gland 24, and a slot or gap 28 is formed in probe 26. As shown in FIG. 2, a first piezoelectric crystal transducer 30 is bonded within probe 26 to a window 32 that forms one side of gap 28, while a second piezoelectric crystal transducer 34 is bonded to the opposing window 36 that defines gap 28. Crystals 30, 34 are covered by epoxy 38, and are connected by leads 40, 42 to the measurement electronics within housing 14.

To the extent thus far described, system 10 is of conventional construction. Slot 28 may be either vertically or horizontally disposed, and fills with liquid when the liquid material rises within vessel 12 to the level of the slot. One of the crystal transducers 30 is either continuously or periodically energized to radiate ultrasonic energy into slot 28. When the slot is filled with air, the energy is attenuated by the relatively poor transmission characteristics of the air, and little or no energy is received at second crystal transducer 34. On the other hand, when liquid fills gap 28, the ultrasonic energy is readily conducted to crystal 34, which functions through electronics within housing 14 to indicate that material has reached the level of the gap. Such indication may sound an alarm, open a valve or start a pump depending upon the user's option. Probe 26 may be relatively long as illustrated in FIG. 1 so as to position gap or slot 28 adjacent to the bottom of vessel 12 for configuring the system for low-level liquid detection. Probe 26 may be relatively short so as to position gap 28 at the upper level of the vessel for high-level detection. Alternatively, one or more probes and housings may be disposed along a sidewall of vessel 12 for high level, low level or intermediate level detection as desired.

Figure 3:
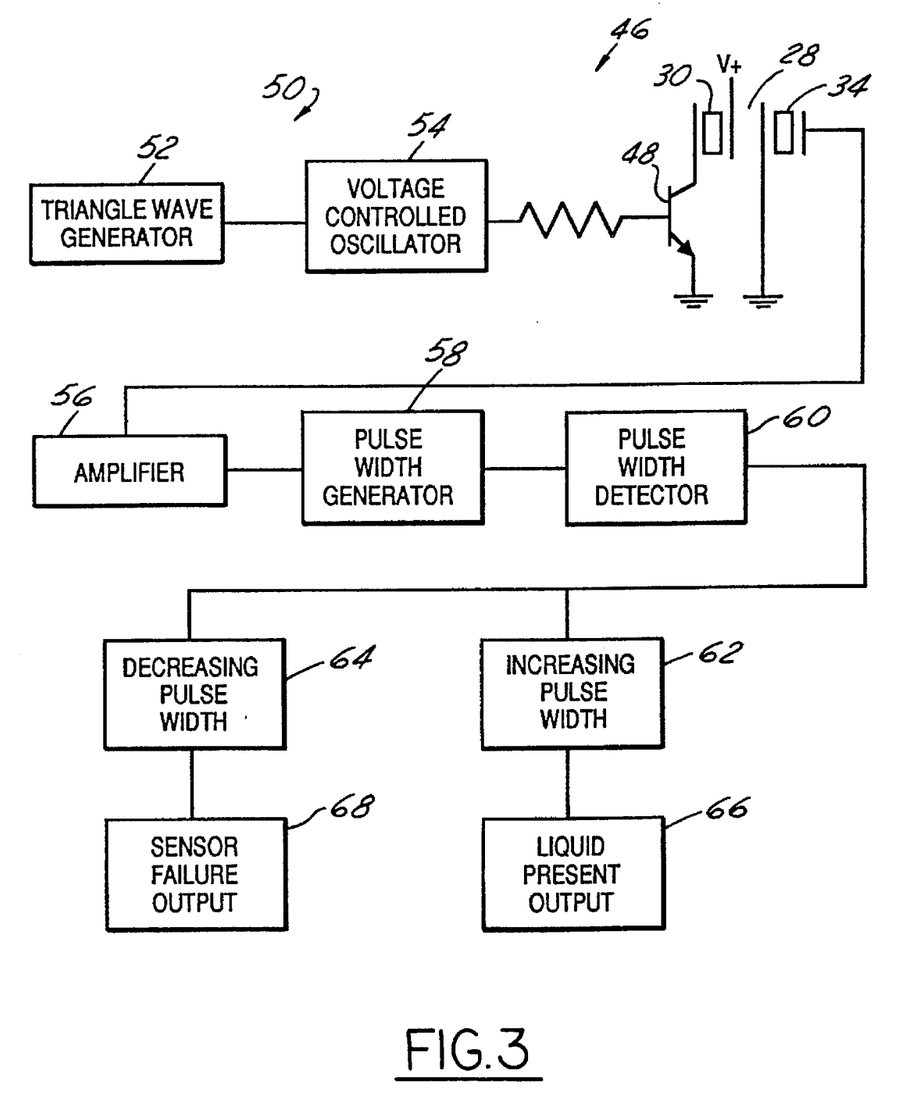
FIG. 3 is a functional block diagram of the liquid level measurement apparatus illustrated in FIGS. 1 and 2.

FIG. 3 is a functional block diagram of the electronics 46 within housing 14 in accordance with a presently preferred embodiment of the invention. Transmitting crystal 30 is energized by a transistor 48, which in turn is driven by a swept frequency oscillator 50 that includes a triangle wave generator 52 connected to the control input of a voltage controlled oscillator 54. Receiving crystal 34 is connected through a signal amplifier 56 to a pulse width generator 58 that generates a pulsed signal having a time duration that varies as a function of the fraction of the total cycle time of swept frequency oscillator 50 during which energy is received at crystal 34. The output of pulse width generator 58 is connected to a pulse width detector 60. A first threshold detector 62 is connected to pulse width detector 60 for indicating presence of liquid in gap 28 when the output pulse width increases above a first threshold level. A second threshold detector 64 is connected to detector 60 for indicating failure of the sensing apparatus when the pulse width decreases below a second threshold. Circuits 62, 64 are connected to corresponding output circuits 66, 68 for indicating liquid presence or sensor failure respectively.

Figure 4A:
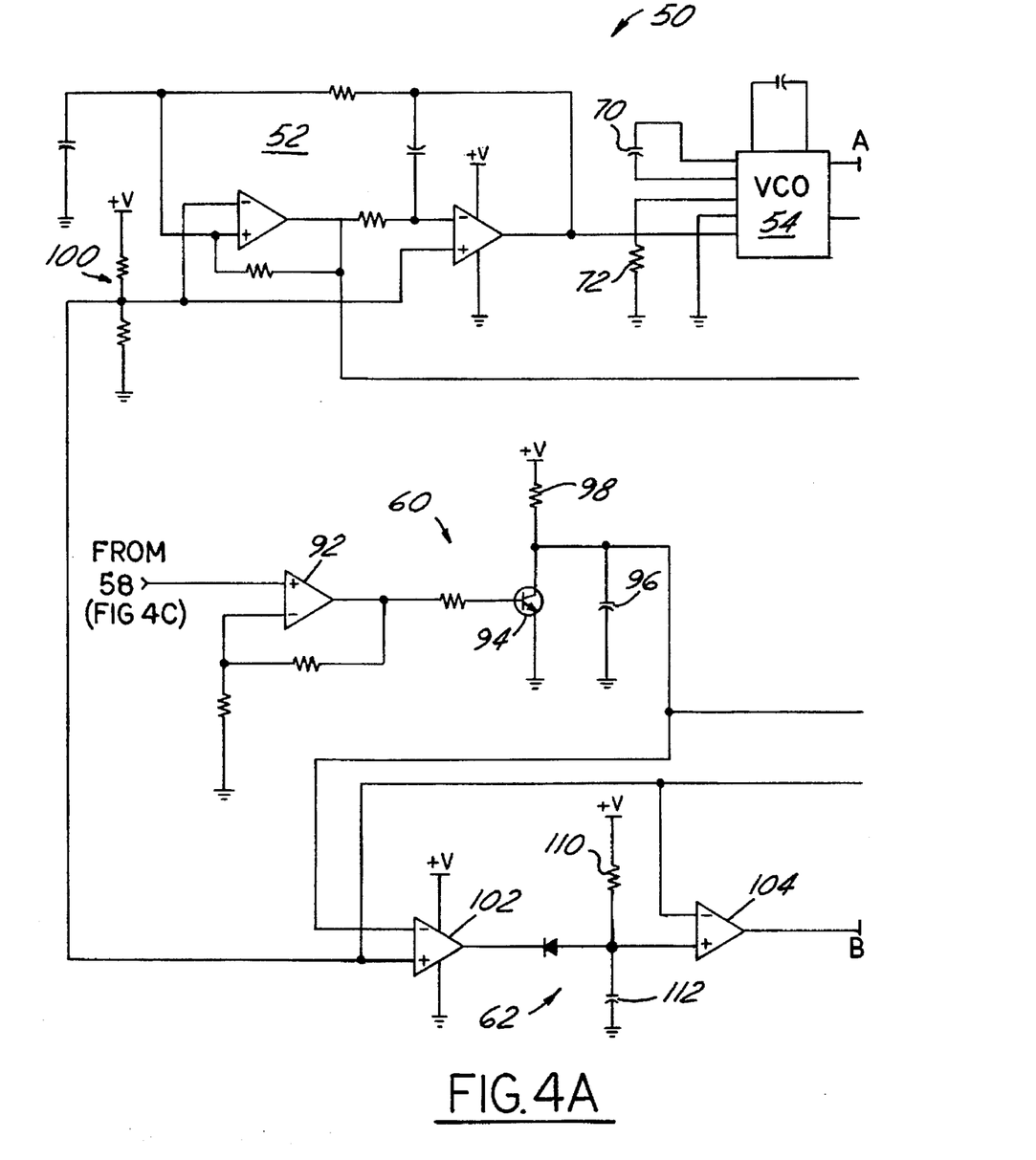
FIGS. 4A–4C together comprise an electrical schematic diagram of the apparatus electronics illustrated functionally in FIG. 3.
Figure 4B:
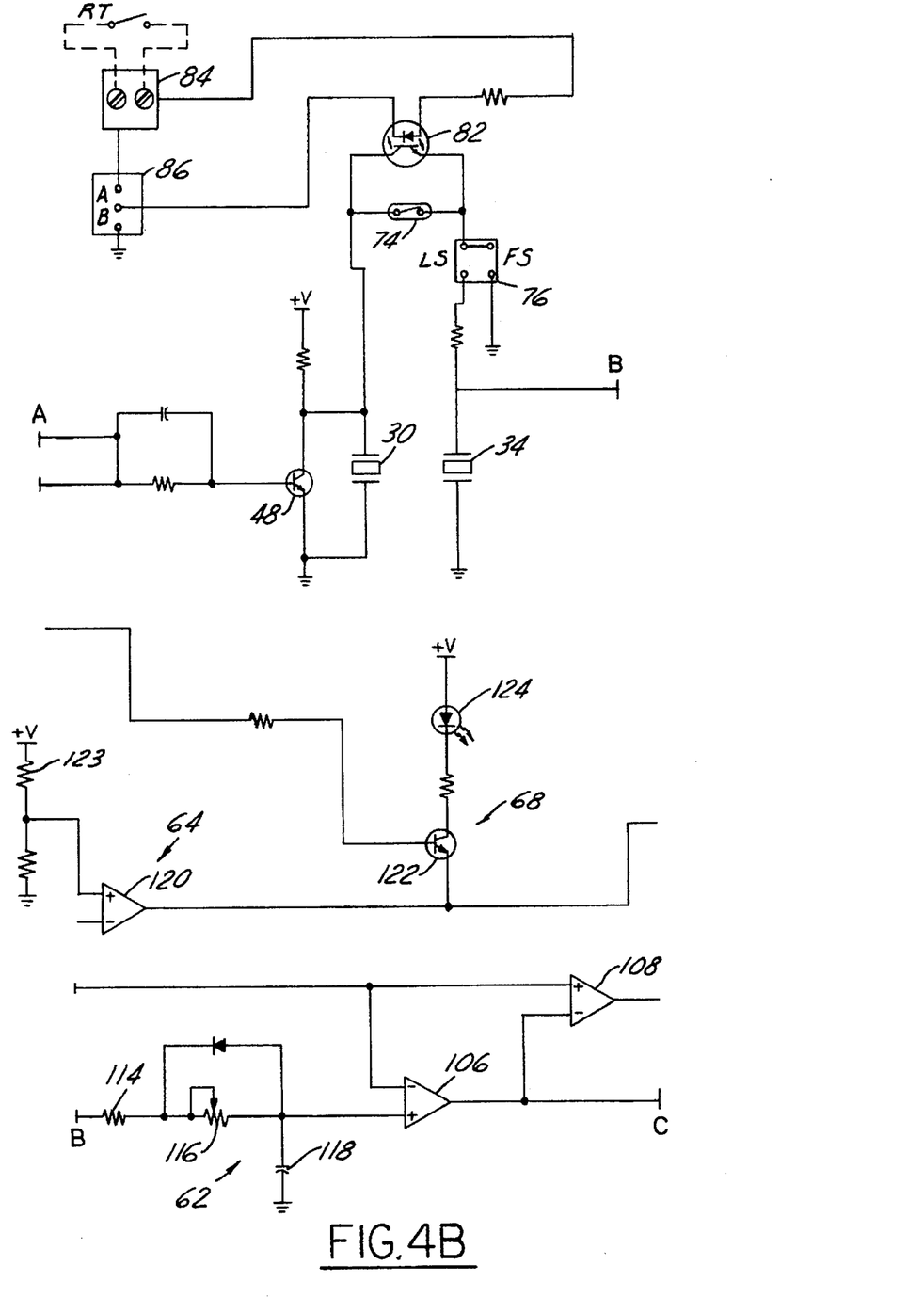
Figure 4C:
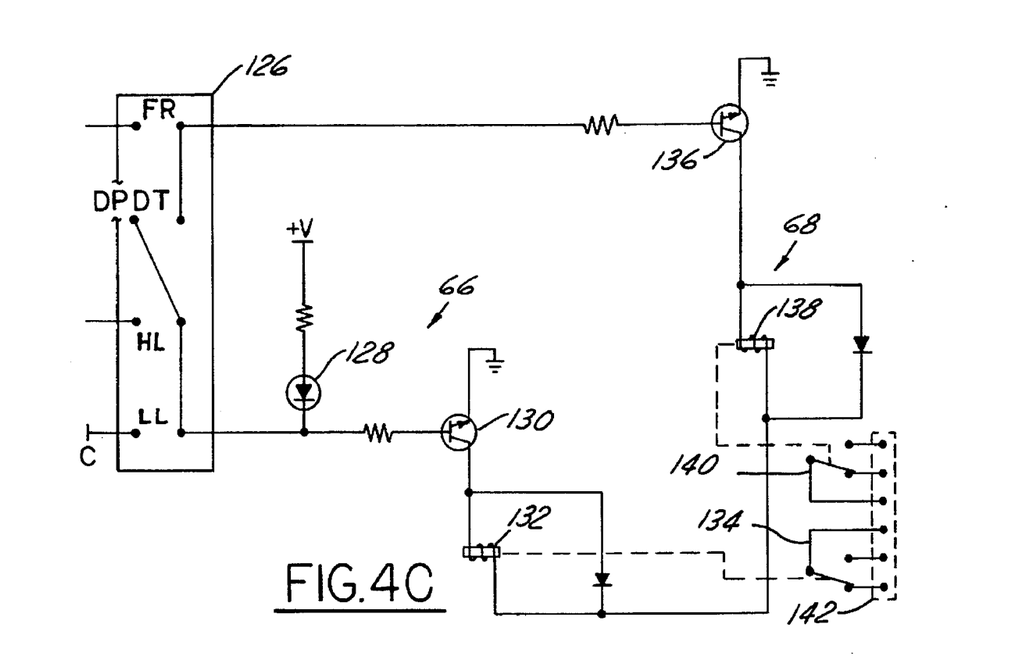

FIGS. 4A–4C, interconnected along the lines A–B in FIGS. 4A and 4B, and lines B–C in FIGS. 4B and 4C, together comprise an electrical schematic diagram of the circuitry illustrated in functional block form in FIG. 3. Triangle wave generator 52 (FIGS. 3 and 4A) is of conventional construction, providing a continuous triangle-wave signal to the control input of voltage controlled oscillator 54 that alternately rises and descends substantially linearly at a total period of about one second. Voltage controlled oscillator 54 has a capacitor 70 and a resistor 72 that determine the range of frequencies swept by oscillator 54 as the control input continuously rises and falls. Preferably, oscillator 54 sweeps from about one hundred kilohertz to about two megahertz during one half-cycle of the control input from triangle wave generator 52, and then from about two megahertz back to about one hundred kilohertz during the other half-cycle of the control input. The preferred cycle time of about one second is not critical. The preferred frequency range of about 100 KHz to about 2 MHz is not critical, although the lower frequency limit should be well below the typical cut-off frequency for good transmission through liquid and below the typical resonant frequency of the entire assembly, while the higher frequency limit should be well above the cut-off frequency for good transmission through the liquid. It has been found that a frequency of 500 KHz is a typical cut-off frequency in a typical liquid, although this varies widely depending upon liquid composition, temperature, density, pressure of air bubbles, etc. As long as the higher frequency range extends well above maximum expected frequency of transmission through the material under all expected operating conditions, and the lower frequency range extends well below minimum expected resonant frequency of the assembly in a vessel under all expected operating conditions, it is completely unnecessary to know actual transmission frequency or resonant frequency.

The output of oscillator 54 is connected to the base of drive transistor 48 (FIGS. 3 and 4B), which in turn is connected to transmitting crystal 30. The ungrounded or signal side of transmitting crystal 30 is connected to the ungrounded or signal side of receiving crystal 34 through a normally open reed switch 74 and a switch device or element 76 connected in series with reed switch 74. Switch element. 76 in the preferred embodiment of the invention comprises a jumper block having one set of jumper terminals LS for connection to the signal side of crystal 34 and a second set of jumper terminals FS for connection to ground. One of the two jumper terminal pairs LS, FS is connected at the time of manufacture or installation for programming the test mode of operation, as will be described. A photo-optic coupler 82 is connected across reed switch 74, and receives a control input from a terminal block 84. The second terminal of terminal block is connected to a jumper block switch device 86 having jumper terminals A and B, again for programming the test mode of operation as will be described. The jumper block switch elements 76, 84 may alternatively comprise two-pole DIP switches single-pole double-throw microswitches, etc.

The signal side of transducer 34 is also connected to, amplifier 56 (FIGS. 3 and 4C) of generally conventional construction, which is connected to pulse width generator 58. Generator 58 comprises a filter that produces a pulsed d.c. signal across a capacitor 90 at the frequency of oscillator 50 (FIGS. 3 and 4A) and at a pulse duration that varies as a function of the time during each period of oscillator 50 in which energy is transmitted through the material gap to the receiving crystal. That is, the voltage across capacitor 90 is high when energy is being transmitted across the material gap to the receiving crystal, and is low when energy is not received at the receiving crystal. The total cycle time is equal to the cycle time of swept frequency oscillator 50, one second in the preferred embodiment. The percentage of total cycle time during which the voltage across capacitor 90 is high depends upon whether the transducer crystals are operating properly, and whether material is present, as will be described. This pulsed d.c. signal is fed to pulse width detector 60 (FIGS. 3 and 4A).

At detector 60, the pulsed signal is fed through an amplifier 92 to a transistor switch 94 that controls the d.c. charge across a capacitor 96. That is, when the pulsed output from pulse width generator 58 (FIGS. 3 and 4C) is low, transistor 94 is turned off and capacitor 96 is charged through resistor 98. On the other hand, when the pulsed output of generator 58 is high, indicating receipt of ultrasonic energy at the receiving crystal, capacitor 96 is discharged through transistor switch 94. Thus, the average d.c. potential on capacitor 96 varies as an inverse function of the time during each swept oscillator cycle in which energy is received at the receiving crystal. When no liquid is present in the gap or space between the crystals, energy is transmitted between the crystal transducers only during the low frequency portions of the swept oscillator cycles in which the assembly is in resonance, and the circuit components are selected so that the potential across capacitor 96 in this situation is at a mid-range level. When liquid is present between the crystals, energy is transmitted between the crystal transducers during the entire or virtually the entire swept oscillator cycle, so that the duration of the pulses from generator 58 is relatively long, and the potential across capacitor 96 (FIG. 4A) is relatively low. On the other hand, if no energy is transmitted between the crystals due to failure or the like, the potential across capacitor 96 will be at a high level.

A voltage divider 100 (FIG. 4A) supplies a reference voltage to triangle wave generator 52, and supplies the same reference voltage to a series of comparators 102, 104 (FIG. 4A), 106 and 108 (FIG. 4B) within increasing pulse width threshold detector 62 (FIGS. 3 and 4A and 4B). When the voltage level across capacitor 96 of detector 60 decreases below the reference level set by voltage divider 100 (FIG. 4A), the output of comparator 102 switches high and, after a time delay determined by resistor 110 and capacitor 112 (FIG. 4A), the output of comparator 104 also switches to a high voltage state. This output is fed to an adjustable time delay circuit that includes a resistor 114, a variable resistor 116 and a capacitor 118 in FIG. 4B, which helps isolate the output of the detection circuitry from transient changes in material level. The output of this time delay circuit is fed to comparator 106, whose output is fed to comparator 108, so that the outputs of comparators 106, 108 are essentially instantaneous mirror images of each other. That is, when the material is between the transducers the output of comparator 106 is high, while the output of comparator 108 is low. On the other hand, when material is not present between the crystal transducers, the output of comparator 108 is high and the output of comparator 106 is low.

Decreasing pulse width threshold detector 64 (FIGS. 3 and 4B) includes a comparator 120 that receives a reference input from a voltage divider 123 and a signal input from capacitor 96 of pulse width detector 60 (FIGS. 3 and 4A). The output of comparator 120 enables operation of a transistor switch 122, which is connected to an LED 124 and receives a control input from triangle wave generator 52 (FIG. 4A). When the voltage across capacitor 96 increases above the reference level established by voltage divider 122, indicating a loss of low frequency signal at receiving crystal 34, operation of transistor switch 22 is enabled and LED 124 is pulsed at the one-hertz frequency of triangle wave generator 52 (FIGS. 3 and 4A). Such. flashing of LED 124 indicates a failure at the crystals, crystal. bonds or the electronic detection circuitry.

The signal outputs of comparators 106, 108 and 120 (FIG. 4B) are fed to a jumper block 126 (FIG. 4C) for tailoring outputs 66, 68 (FIGS. 3 and 4C) to the needs of the user. Jumper block 126 has two pair of jumper contacts LL and HL for selecting low level fail safe and high level fail safe operation respectively. That is, if a jumper is placed across contacts LL, output 66 is driven by comparator 106 (FIG. 4B), and will indicate a low level condition (material not present in gap 28) in the event of a power failure independent of actual material level. On the other hand, if a jumper is placed across high level fail safe contacts HL, output 66 is driven by comparator 108, and will indicate a high level condition. (material within gap 28) in the event of a power failure regardless. of actual material level. The selection between low level fail safe operation and high level fail safe operation is typically made by the user at the time of installation, as is conventional practice in the art. Jumper block 126 also includes a pair of jumper contacts FR and a pair of jumper contacts DPDT, which are alternately selected for driving output 68 either in response to the failure indication output of comparator 120 (FIG. 4B), or as a double pole double throw relay output desired by some users in response to the material level indication. In the event that the user selects the DPDT jumper option at block 126, then output 68 is effectively connected in parallel with output 66 in FIG. 3, and sensor failure is indicated only by LED 124 (FIG. 4B).

Liquid level output 66 (FIGS. 3 and 4C) includes an LED 128 that is illuminated when material is detected within the material gap between the transducers. A transistor switch 130 drives a relay coil 132 that is connected to a set of relay switch contacts 134. Sensor failure output 68 (FIGS. 3 and 4C) includes a transistor switch 136 that drives a relay coil 138 connected to a set of relay switch contacts 140. Relay switch contacts 134, 140 are connected to a terminal block 142, which in turn is connected by suitable cabling to the alarms, valves or pumps, etc. selected by the user.

Returning to FIG. 4B, the test mode of operation is programmed through jumper block 86 and jumper block 76 at the time of manufacture or installation as previously indicated. That is, jumpers are connected between jumper contacts A and B in block 86 depending upon whether closure of remote test switch RT is to close a circuit through coupler 82 (as shown) or apply a voltage to the coupler. In the same way, a jumper is positioned either between contacts LS in block 76 if closure of switch 74 or switch/coupler 82 is to simulate presence of liquid between crystals 30, 34, or across jumper contacts FS if closure of switch 74 or switch/coupler 82 is to simulate system failure. Testing of the circuit may then be automatically initiated either by placing a magnet adjacent to housing 14 (FIG. 1) as described in U.S. Pat. No. 5,048,335, or by remote closure of remote test switch RT as described in U.S. Pat. No. 4,676,100. In either event, the signal from swept oscillator 50 that energizes transmitting crystal 30 is either fed directly to amplifier 56 through switch 74 or 82 and jumper contacts LS to simulate presence of liquid between the crystals, or fed to ground through switch 74 or 82 and jumper contacts FS to simulate a failure situation. Use of a jumper block of the type illustrated at 126 (FIG. 4C) for high level, low level and double pole double throw operation is also discussed in U.S. Pat. No. 5,161,411. All of such patents are assigned to the assignee hereof.

It will thus be recognized that integrity of the material level detecting apparatus of the invention is continuously and automatically tested by alternately applying low frequency and high frequency ultrasonic energy to the transmitting crystal in the self-test and measurement modes of operation respectively. Transmissions of the low and high frequency components for failure and measurement. purposes are compared to respectively different thresholds determined by voltage dividers 122 and 100 (FIGS. 4B and 4A) respectively, which effectively provides a gap between the two detection thresholds to eliminate ambiguous situations. Furthermore, since the ultrasonic frequency continuously sweeps back and forth between low and high frequency ranges, the apparatus is substantially insensitive to variations in liquid density and contaminants, presence of air bubbles, variation in temperature and acoustic conductivity, etc., as previously discussed.

I claim:

1. Apparatus for indicating level of material comprising:
    means for operatively coupling a pair of ultrasonic transducers to a space for receiving the material such that energy transmitted between said transducers traverses said space,
    means for applying electrical signals to one of said transducers so that said one of said transducers radiates into said space toward the other of said transducers ultrasonic energy that continuously sweeps back and forth between a high frequency range at which energy is transmitted through said space and any material in said space between said sensors and a low frequency range at which energy is transmitted between said sensors through said operatively coupling means independent of said space and any material in said space between said sensors,
    means responsive to energy received at said other transducer at said high frequency range for indicating presence of material in said space between said transducers, and
    means responsive to energy received at said other transducer at said low frequency range for indicating operative condition of said apparatus including said transducers independent of presence of material in said space between said transducers.

2. The apparatus set forth in claim 1 wherein said high frequency range is greater than 500 KHz, and said low frequency range is less than 500 KHz.

3. The apparatus set forth in claim 1 wherein said signal applying means comprises a swept frequency oscillator.

4. The apparatus set forth in claim 3 wherein said swept. frequency oscillator has a frequency range of about 100 KHz to about 2 MHz.

5. The apparatus set forth in claim 3 wherein said means responsive to energy received at said other transducer at said low frequency range comprises an LED and means for energizing said LED to flash on and off at the sweep frequency of said swept frequency oscillator.

6. The apparatus set forth in claim 1 further comprising means coupled to said other transducer for providing a pulsed signal having a pulse width that varies as a function of time during which ultrasonic energy is received at said other transducer as said signal sweeps continuously and alternately between said low and high frequency ranges.

7. The apparatus set forth in claim 6 wherein said presence-indicating means comprises means responsive to said pulsed signal for indicating presence of material when said pulse width is greater than a first threshold.

8. The apparatus set forth in claim 7 wherein said condition-indicating means comprises means responsive to said pulsed signal for indicating operative condition of said apparatus when said pulse width is less than a second threshold.

9. The apparatus set forth in claim 1 further comprising means operatively connected between said transducers for testing operation of said apparatus independent of said transducers, independent of said means for operatively coupling said transducers to said space, and independent of presence or absence of material in said space.

10. The apparatus set forth in claim 9 wherein said condition-testing means comprises means for selectively simulating either presence of material in said space between said transducers or failure of said apparatus upon operation of said operation-testing means.

11. The apparatus set forth in claim 10 wherein said operation-testing means comprises first and second switch means connected in series between said transducers, said first switch means having a normally open condition and assuming a closed condition to initiate a test mode of operation, said second switch means having one conductive condition for applying energy from said one transducer through said first switch means to said other transducer to simulate presence of material in said space and a second conductive condition that blocks application of energy from said one transducer through said first switch means to said other transducer independent of frequency to simulate failure of said apparatus.

12. Apparatus for indicating level of material comprising:
    means for operatively coupling a pair of ultrasonic transducers to a space for receiving material such that energy transmitted between said transducers traverses said space through the material,
    means for applying electrical signals to one of said transducers so that said one of said transducers radiates ultrasonic energy into said space toward the other transducer,
    means responsive to energy received at the said other transducer for indicating presence of material in said space between said transducers, and
    means operatively connected between said transducers for testing operation of said apparatus independent of said transducers, independent of said means for operatively coupling said transducers to said space, and independent of presence or absence of material in said space.

13. The apparatus set forth in claim 12 wherein said condition-testing means comprises means for selectively simulating either presence of material in said space between said transducers or failure of said apparatus upon operation of said means operatively connected between said transducers for testing operation of said apparatus.

14. The apparatus set forth in claim 13 wherein said operation-testing means comprises first and second switch means connected in series between said transducers, said first switch means having a normally open condition and assuming a closed condition to initiate a test mode of operation, said second switch means having one conductive condition for applying energy from said one transducer through said first switch means to said other transducer to simulate presence of material in said space and a second conductive condition that blocks application of energy from said one transducer through said first switch means to said other transducer independent of frequency to simulate failure of said apparatus.

* * * * *